(12) United States Patent  (10) Patent No.: US 9,303,990 B2
Bascom et al.  (45) Date of Patent: Apr. 5, 2016

(54) LASER LINE GENERATING DEVICE

(71) Applicant: BLACK & DECKER INC., Newark, DE (US)

(72) Inventors: James P. Bascom, Bel Air, MD (US); Kun Chang, Suzhou (CN); Jia Yong Jiang, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 57 days.

(21) Appl. No.: 14/251,189

(22) Filed: Apr. 11, 2014

(65) Prior Publication Data

US 2015/0292886 A1  Oct. 15, 2015

(51) Int. Cl.
*G01C 15/00* (2006.01)

(52) U.S. Cl.
CPC ............ *G01C 15/002* (2013.01); *G01C 15/004* (2013.01)

(58) Field of Classification Search
CPC .............................. G01C 15/002; G01C 15/004
USPC ............................................... 33/29, DIG. 21
See application file for complete search history.

(56) References Cited

U.S. PATENT DOCUMENTS

| | | | |
|---|---|---|---|
| 5,144,487 A | 9/1992 | Hersey | |
| 5,500,524 A | 3/1996 | Rando et al. | |
| 5,539,990 A | 7/1996 | Le | |
| 5,617,202 A | 4/1997 | Rando | |
| 5,864,956 A * | 2/1999 | Dong ..................... | G01B 11/26 33/227 |
| 6,005,716 A | 12/1999 | Ligtenberg et al. | |
| 6,005,719 A | 12/1999 | Rando et al. | |
| 6,154,319 A | 11/2000 | Rando et al. | |
| 6,282,028 B1 | 8/2001 | Waibel et al. | |
| 6,292,303 B1 | 9/2001 | Hamar et al. | |
| 6,327,090 B1 | 12/2001 | Rando et al. | |
| 6,625,895 B2 * | 9/2003 | Tacklind ............... | G01C 15/002 33/275 R |
| 6,675,489 B2 * | 1/2004 | Ohtomo .................. | G01C 9/06 250/559.3 |
| 6,694,630 B2 | 2/2004 | Dang et al. | |
| 6,892,463 B1 | 5/2005 | Pu et al. | |
| 6,931,737 B1 * | 8/2005 | Liao ...................... | G01C 15/004 33/227 |
| 7,006,298 B2 | 2/2006 | Morrissey et al. | |
| 7,031,367 B2 * | 4/2006 | Marshall .................. | G01C 9/12 33/281 |
| 7,059,057 B2 * | 6/2006 | Raskin ................. | G01C 15/004 33/281 |
| 7,092,167 B2 | 8/2006 | Morrissey et al. | |

(Continued)

FOREIGN PATENT DOCUMENTS

EP         1394507         3/2004

OTHER PUBLICATIONS

Hague Search, Aug. 20, 2015.

*Primary Examiner* — Yaritza Guadalupe-McCall
(74) *Attorney, Agent, or Firm* — Michael J. Aronoff

(57) ABSTRACT

A laser beam generating device is provided for generating multiple mutually orthogonal light beams. The device includes a laser light generator that generates at least three output beams. A beamsplitter of the laser light generator has two incident surfaces orientated at forty-five degrees in relation to an optical axis. A first portion of a light from a light source is incident on a first of the two incident surfaces and output as a first output beam in a first direction orthogonal to the optical axis. A second portion of the light is incident on a second of the two incident surfaces and output as a second output beam in a second direction opposite the first direction. The light source is arranged in relation to the beamsplitter such that a third portion of the light bypasses the beamsplitter and forms a third output beam projected parallel to the optical axis.

20 Claims, 12 Drawing Sheets

(56) References Cited

U.S. PATENT DOCUMENTS

| | | |
|---|---|---|
| 7,134,211 B2 | 11/2006 | Bascom et al. |
| 7,136,233 B2 | 11/2006 | Dang et al. |
| 7,178,250 B2 | 2/2007 | Nash et al. |
| 7,228,635 B2 | 6/2007 | Jian et al. |
| 7,266,897 B2 * | 9/2007 | Treichler .............. G01C 15/105 33/283 |
| 7,268,951 B2 | 9/2007 | Dang et al. |
| 7,310,886 B2 | 12/2007 | Bascom et al. |
| 7,392,592 B2 | 7/2008 | Bublitz et al. |
| 7,469,481 B2 | 12/2008 | Nash et al. |
| 7,497,018 B2 | 3/2009 | Hersey et al. |
| 7,640,672 B2 | 1/2010 | Burry et al. |
| 7,797,844 B2 | 9/2010 | Hobden et al. |
| 7,992,310 B2 * | 8/2011 | Litvin .................. G01C 15/004 33/281 |
| 8,011,105 B2 | 9/2011 | Wilson et al. |
| 8,037,562 B2 | 10/2011 | Kemper et al. |
| 8,640,350 B2 | 2/2014 | Bascom et al. |
| 8,745,884 B2 | 6/2014 | Hayes et al. |
| 8,813,379 B2 | 8/2014 | Zimmermann |
| 8,848,180 B1 | 9/2014 | Vanneman et al. |
| 9,110,308 B2 | 8/2015 | Zimmermann |
| 2010/0313433 A1 * | 12/2010 | Hayashi ............... G01C 15/004 33/291 |
| 2015/0000144 A1 | 1/2015 | Yuen et al. |
| 2015/0007437 A1 | 1/2015 | Zimmermann |
| 2015/0292886 A1 * | 10/2015 | Bascom ............... G01C 15/002 33/291 |

* cited by examiner

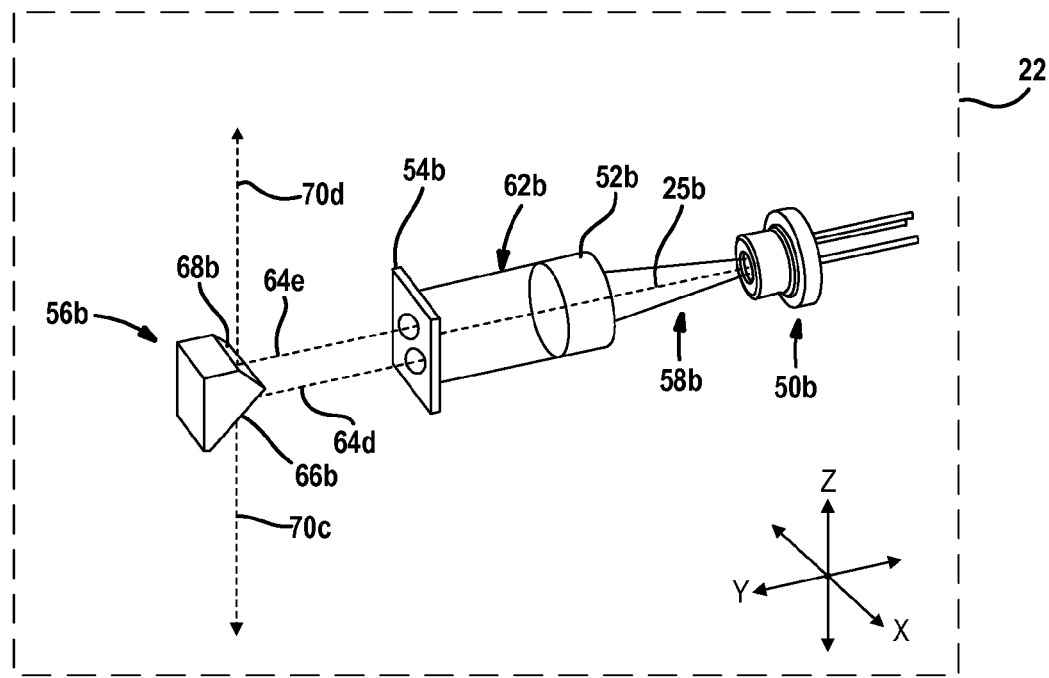
FIG. 6A
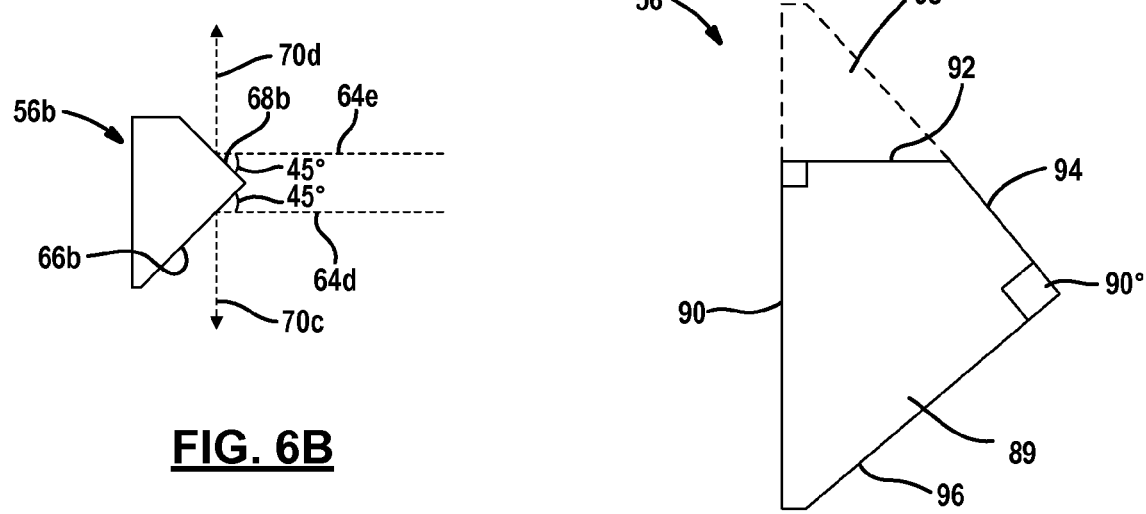
FIG. 6B
FIG. 7

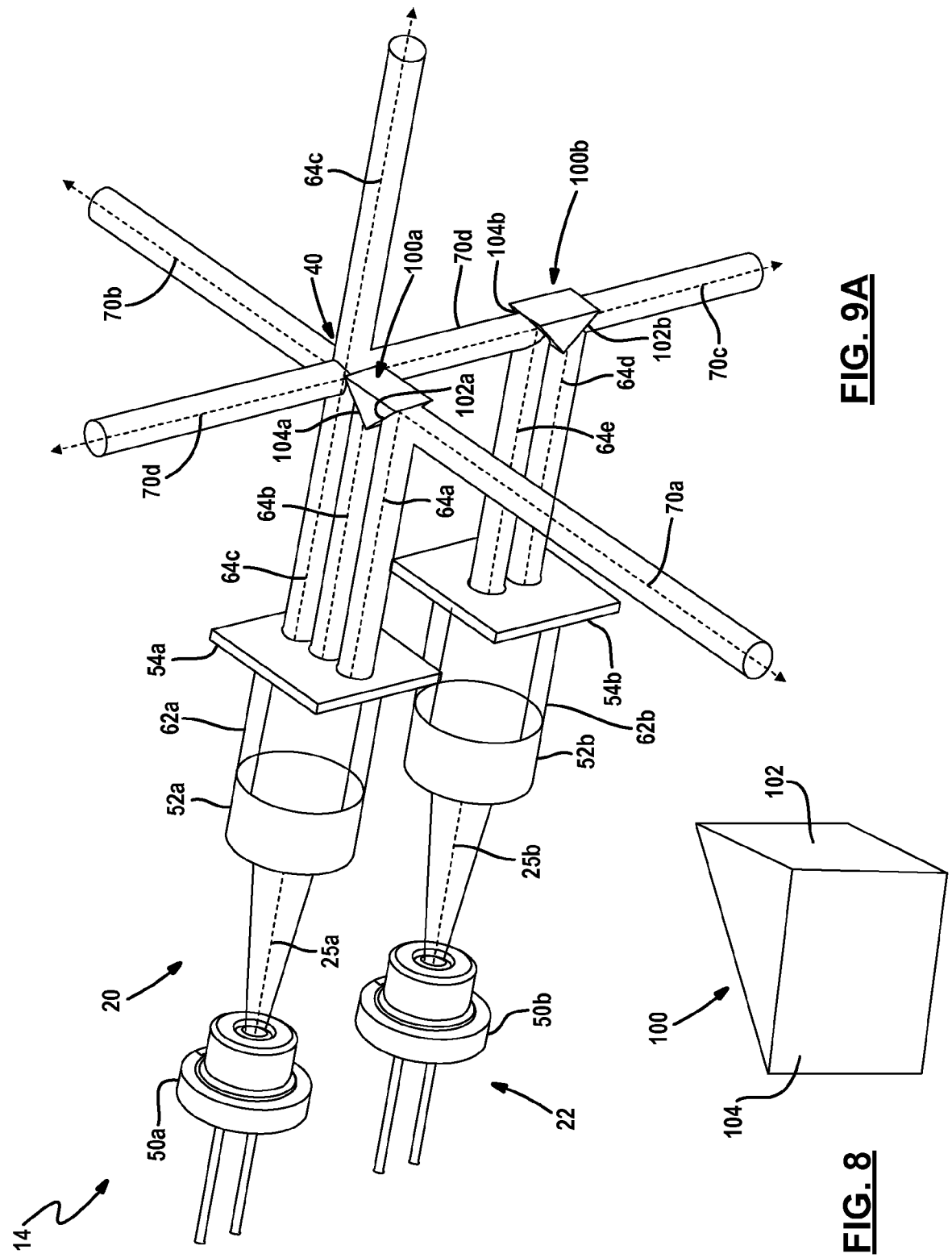

LASER LINE GENERATING DEVICE

FIELD

The present disclosure relates to a laser beam generating device for generating multiple mutually orthogonal light beams.

BACKGROUND

A laser beam generating device is commonly used in the construction industry for alignment and measurement of construction layouts. A conventional laser beam generating device generates multiple light beams using an optical system. The optical system may include a light source which generates a light beam and a beamsplitter for splitting the light beam into multiple beams. The beams are typically orthogonal to another beam and/or directed in a direction opposite to another beam.

In an effort to employ a minimal number of components, an optical system for a laser light generating device may include a specialized beamsplitter. For example, the specialized beamsplitter may include multiple pieces which are joined together for generating five orthogonal light beams from a single light source. Although the laser light generating device may employ a minimal number of components for the optical system, the complexity of such an optical system and specialized beamsplitter may result in a bulky and expensive laser beam generating device.

This section provides background information related to the present disclosure which is not necessarily prior art.

SUMMARY

This section provides a general summary of the disclosure, and is not a comprehensive disclosure of its full scope or all of its features.

A laser beam generating device for emitting multiple mutually orthogonal light beams is comprised of a housing and a laser light generator. The housing may have an opening for emitting each generated the light beam.

In an exemplary embodiment, the laser light generator is disposed in the housing and is operable to generate three output beams. The laser light generator includes a light source projecting light along an optical axis toward a beamsplitter, and a collimating lens interposed on the optical axis between the light source and the beamsplitter. The beamsplitter has two incident surfaces orientated at forty-five degrees in relation to the optical axis and at ninety degrees to each other. A first portion of the light from the light source is incident on a first of the two incident surfaces and reflected from the first surface as a first output beam in a first direction orthogonal to the optical axis. A second portion of the light from the light source is incident on a second of the two incident surfaces and reflected from the second surface as a second output beam in a second direction opposite the first direction. The light source is arranged in relation to the beamsplitter such that a third portion of the light from the light source bypasses the beamsplitter and forms a third output beam projected parallel to the optical axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A and 6B are perspective views of a two beam generator of the laser light generator;

FIG. 7 is a perspective view of an example beamsplitter having a truncated triangular shape;

FIG. 8 is a perspective view of an example beamsplitter having a triangular shape;

FIG. 9A is a perspective view of the laser light generator including the beamsplitter of FIG. 8;

Corresponding reference numerals indicate corresponding parts throughout the several views of the drawings.

DETAILED DESCRIPTION

Figure 1:
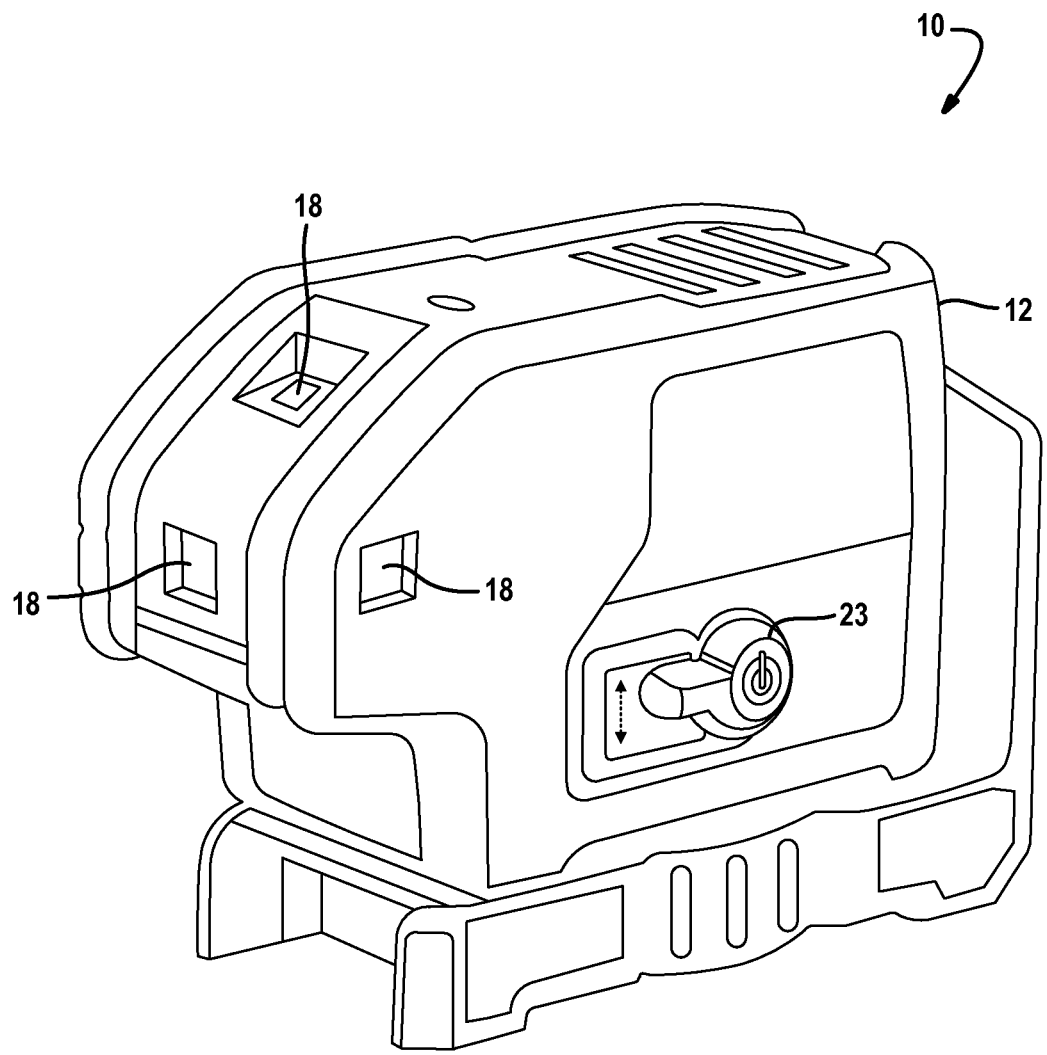
FIG. 1 is a perspective view of an example laser beam generating device.
Figure 2:
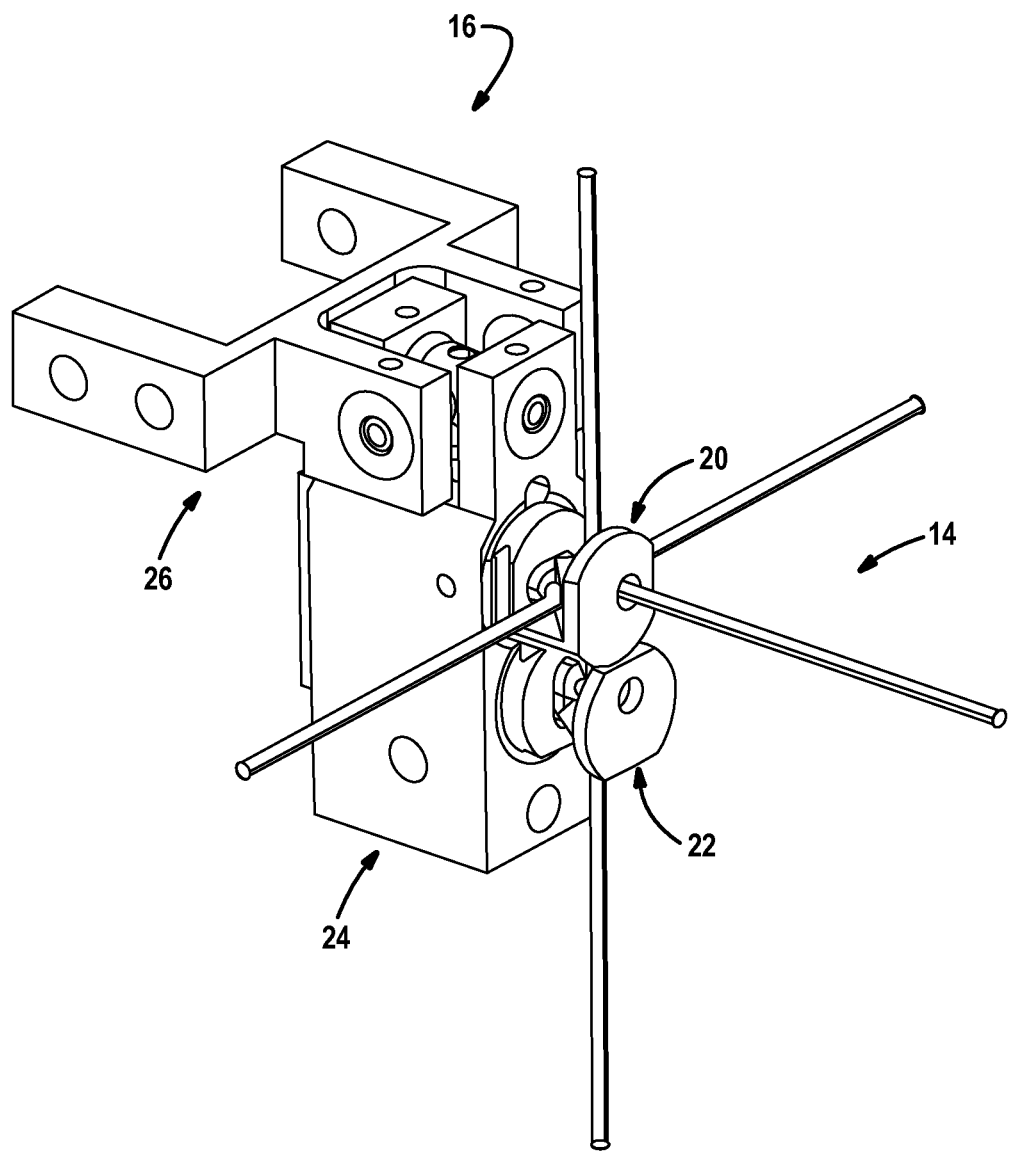
FIG. 2 is a perspective view of a leveling mechanism and a laser light generator of the laser beam generating device.
Figure 3:
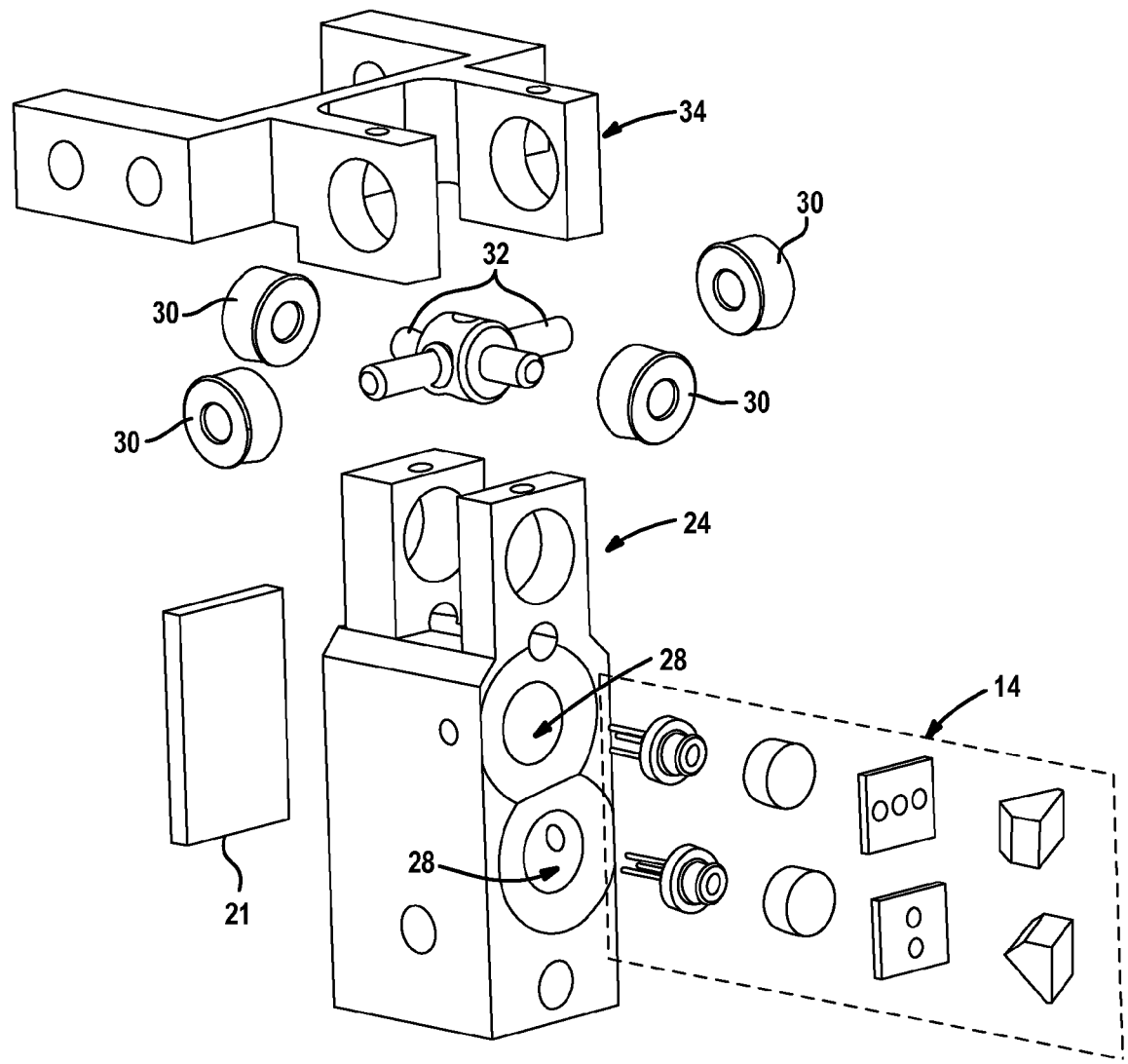
FIG. 3 is an exploded view of FIG. 2 depicting components of the leveling mechanism and the laser light generator.

The present disclosure will now be described more fully with reference to the accompanying drawings. With reference to FIGS. 1-3, an example of a laser beam generating device 10 of the present disclosure is now presented. The laser beam generating device 10 generates multiple orthogonal light beams which are self-leveled when the laser beam generating device 10 rests on a support surface.

The laser beam generating device 10 includes a housing 12, a laser light generator 14, and a leveling mechanism 16. The housing 12 may include multiple pieces which form a cavity when joined together. The laser light generator 14 and the leveling mechanism 16 are disposed within the housing 12. The housing 12 defines multiple openings 18 each for emitting a generated light beam.

In the example embodiment, the laser light generator 14 emits up to five light beams along five directions. The laser light generator 14 includes a three beam generator 20, a two beam generator 22, an automatic power control (APC) circuit 21, and a power source (not shown). The three beam generator 20 emits three light beams and the two beam generator 22 emits two light beams, as described below. The APC circuit 21 controls the power provided to the generators 20, 22 from the power source. The power source may be, for example, one or more batteries.

The laser beam generating device 10 may be turned ON/OFF via a switch 23 disposed along the housing 12. The switch 23 is electrically coupled to the power source, which is electrically coupled to the APC circuit 21. Accordingly, when the switch 23 is placed in the ON position, the power source provides power to the APC circuit 21 which supplies power to one or both of the generators 20, 22.

As an alternative to turning on both the three beam generator 20 and the two beam generator 22, the switch 23 and the APC circuit 21 may be configured to select and turn on a specific number of beams from the laser beam generating device 10. For example, the switch 23 may include a three-beam, a two-beam and five-beam setting. Accordingly, when the switch 23 is set to three beams, the APC circuit 21 supplies power to the three beam generator 20 and not the two beam generator 22. On the other hand, when the switch 23 is set to two beams, the APC circuit 21 supplies power to the two beam generator 22 and not the three beam generator 20. Furthermore, when the switch 23 is set to five beams the APC circuit 21 supplies power to the three beam generator 20 and the two beam generator 22. Once power is provided, the three beam generator 20 and/or the two beam generator 22 emit their respective light beams.

The laser light generator 14 is coupled to the leveling mechanism 16. The leveling mechanism 16 levels an optical axis 25 of the laser light generator 14 (optical axis 25 shown in FIG. 4). The leveling mechanism 16 includes a chassis 24 and a gimbal assembly 26. The chassis 24 houses the laser light generator 14. For example, the chassis 24 may define multiple bores 28 which hold the three beam generator 20 and the two beam generator 22. The APC circuit 21 and the power source may also be housed by or coupled to the chassis 24. While the bores 28 are depicted as one bore on top of the other, the bores may be arranged differently based on the configuration of the three beam generator 20 and two beam generator 22.

The gimbal assembly 26 pivotally couples the chassis 24 to the housing 12. In the example embodiment, the gimbal assembly 26 includes a plurality of bearings 30, at least two pins 32, and a gimbal frame 34. The gimbal frame 34 is fixedly coupled to the housing 12. The chassis 24 is rotatably coupled to the gimbal frame 34 via the pins 32 and the bearings 30. Accordingly, when the laser beam generating device 10 rests upon a support surface, the leveling mechanism 16 ensures that the chassis 24 is plumb, thereby leveling the optical axis 25 of the laser light generator 14. While a particular leveling mechanism is depicted, it would be appreciated by one skilled in the art that other leveling mechanism may be employed.

The leveling mechanism 16 may also include a lock mechanism (not shown) for enabling and disabling the self-leveling function of the leveling mechanism 16. For example, when the lock mechanism is engaged, the leveling mechanism may be in a manual state. In the manual state, the position of the chassis 24 is fixed, thereby disabling the pivotable motion for leveling the optical axis 25. On the other hand, when the lock mechanism is disengaged, the leveling mechanism 16 is in a self-leveling state in which the chassis 24 is pivotable and, thus, levels the optical axis 25.

The leveling mechanism 16 may also include a leveling indicator (not shown). The leveling indicator triggers an alarm when the leveling mechanism 16 reaches an end of its leveling range. For example, the leveling indicator may emit a sound, turn on a warning light, and/or provide other suitable signals.

The laser beam generating device 10 may be placed on and/or coupled to a surface. More particularly, the laser beam generating device 10 may include an attachment portion. For example, the attachment portion may be powered magnets which use magnetic force to couple to a surface, such as a beam, ceiling, etc. In addition to or in lieu of the powered magnets, the attachment portion may also include multiple legs that extend from a base of the housing 12. The legs elevate the housing 12 from the surface on which the laser beam generating device 10 is positioned by a predetermined distance.

In operation, the laser beam generating device 10 is positioned on a surface, such as a beam, ceiling, floor, etc. Based on the position of the laser beam generating device 10, the leveling mechanism 16 may level the optical axis 25 of the laser light generator 14. When the switch 23 is placed in the ON position, the laser beam generation device 10 emits multiple light beams along multiple directions. As visual indicators, the light beams extend in air as straight lines along mutually orthogonal axes and form a marker, such as a dot, on a surface that the light beam is incident on. In addition, based on a setting of the switch 23, the laser beam generating device 10 may emit two light beams, three light beams, or five light beams via the laser light generator 14.

With reference to FIGS. 4-7, an example of the laser light generator 14 is presented. For purposes of clarity, the figures may depict a dotted line to represent a given light beam in lieu of a beam, where the dotted line represents an axis of the light beam. The laser light generator 14 may emit three light beams via the three beam generator 20, two light beams via the two beam generator 22, or five light beams via both the three beam generator 20 and the two beam generator 22. The light beams emitted by the laser light generator 14 are orientated and aligned so as to appear to be originating from a common point 40.

Figure 4:
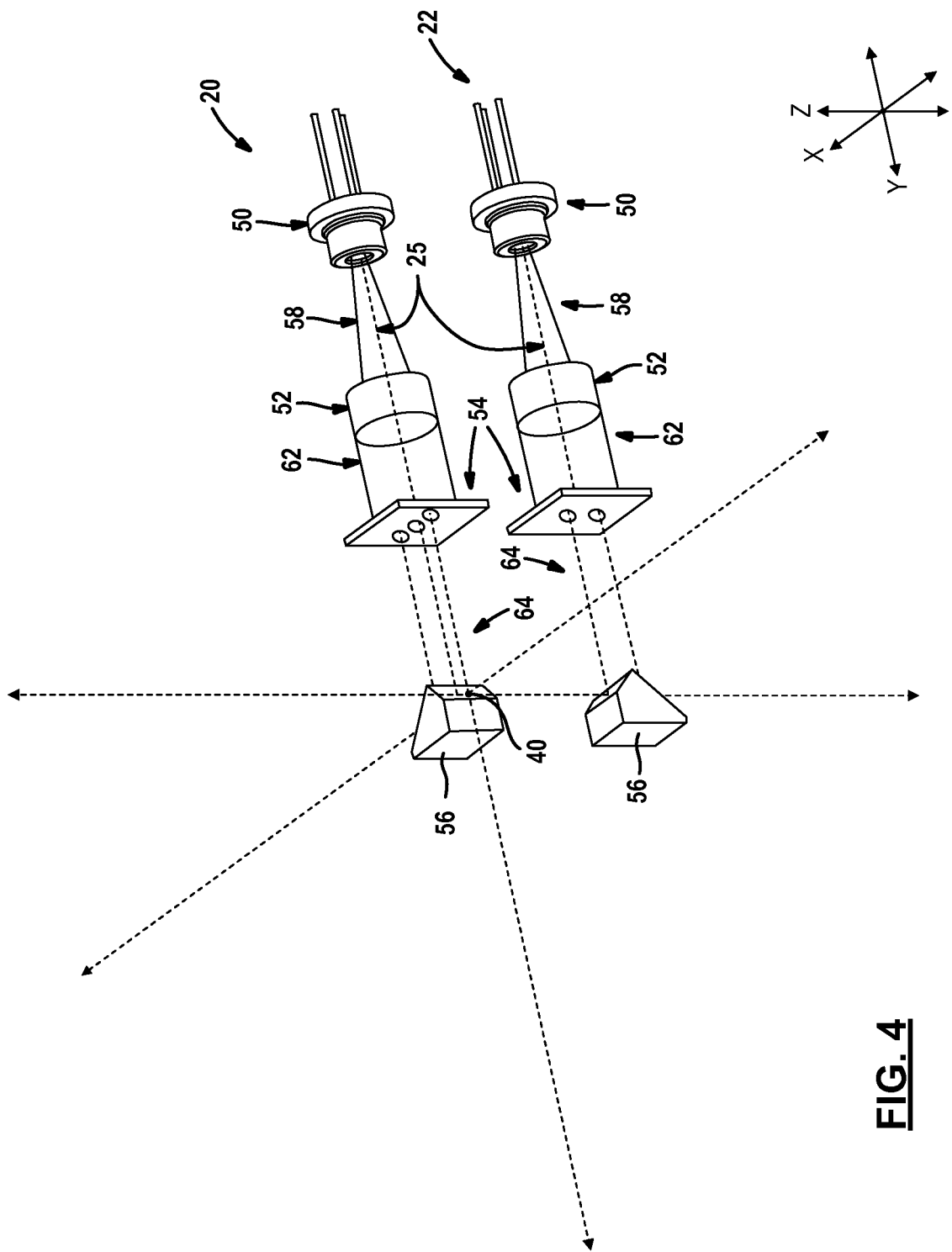
FIG. 4 is a perspective view of the laser light generator.

As shown in FIG. 4, each of the three beam generator 20 and the two beam generator 22 include a light source 50, collimating lens 52, a shaping member 54, and a beamsplitter 56. For ease of explanation, the direction of the light beams generated by the laser light generator 14 may be described with reference to a coordinate system provided in the figures.

The light source 50 projects a light 58 along the optical axis 25 which is parallel to the y-axis. The light source 50 emits the light 58 toward the beamsplitter 56. The light source 50 may be a laser diode or other suitable light emitting source.

The collimating lens 52 is disposed between the light source 50 and the beamsplitter 56 along the optical axis 25. The collimating lens 52 receives the light 58 and outputs a collimated light beam 62.

Figure 5A:
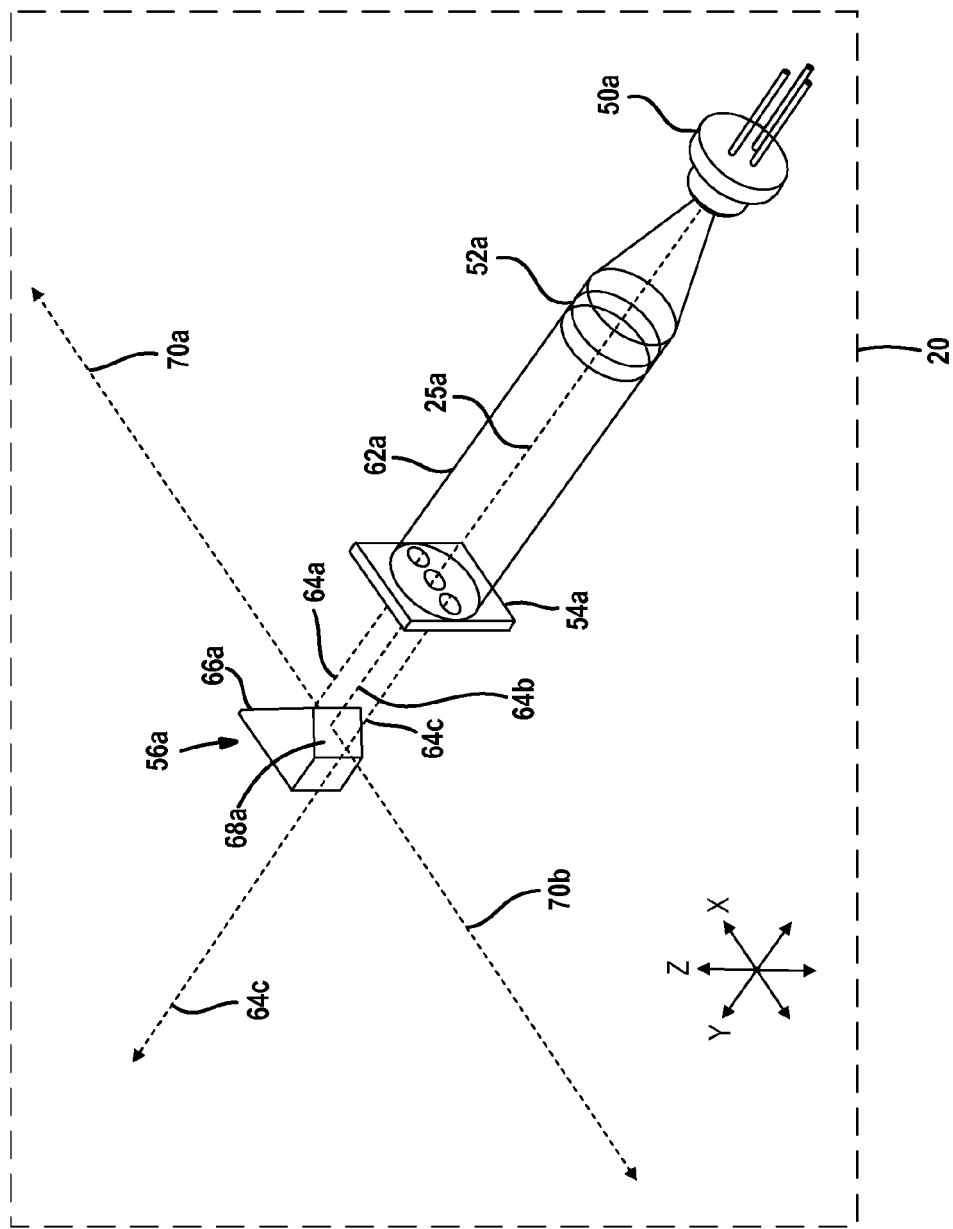
FIGS. 5A and 5B are perspective views of a three beam generator of the laser light generator.

Each generator 20, 22 includes a shaping member 54. In this exemplary embodiment, the shaping member 54 is disposed between the collimating lens 52 and the beamsplitter 56. The shaping member 54 defines at least one aperture through which a portion of the collimated light beam 62 passes. The apertures convert the collimated light beam 62 into multiple incident light beams 64 having a symmetrical cross-section. For example, as shown in FIG. 5A, the three beam generator 20 may include a three-hole shaping member 54a that forms three light beams 64a, 64b, 64c. These portions of the collimated light beam 62a have a circular cross-section. Furthermore, as shown in FIG. 6A, the two beam generator 22 may include a two-hole shaping member 54b that forms two light beams 64d, 64e. These portions of the collimated light beam 62b have a circular cross-section. While the apertures of the shaping member 54 are depicted as having a circular shape, other suitable shapes may be used to define the aperture.

For ease of explanation of the beamsplitter 56, when referring to the collimated light beam 62 in the following description, the collimated light beam 62 may also refer to the light beams 64 from the shaping member 54.

The beamsplitter 56 receives the collimated light beam 62 and splits the collimated light beam 62 into multiple light beams. With regard to the three beam generator 20, the light source 50a and the beamsplitter 56a of the three beam generator 20 are arranged and aligned with respect to each other such that the collimated light beam 62a is split into three light beams 64a, 64b, 64c (FIG. 5A). With regard to the two beam generator 22, the light source 50b and the beamsplitter 56b are arranged and aligned with respect to each other such that the collimated light beam 62b is split into two light beams 64d, 64e (FIG. 6A).

Figure 5B:
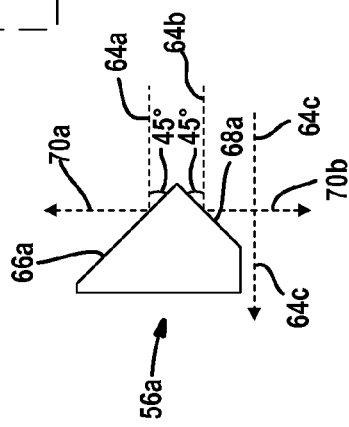

With reference to FIGS. 5A-5B, the beamsplitter 56a of the three beam generator 20 is arranged such that some of the collimated light beam 62a is incident to the beamsplitter 56a and some of the collimated light beam 62a bypasses the beamsplitter 56a. Specifically, the beamsplitter 56a has two incident surfaces (a first surface 66a and a second surface 68a) orientated at forty five degrees with respect to the optical axis 25a (y-axis) and ninety degrees with respect to each other. A first portion of the collimated light beam 62a (i.e., light beam 64a) is incident on the first surface 66a. The first portion 64a is reflected by the first surface 66a as a first output beam 70a. The first output beam 70a projects along a first direction orthogonal to the optical axis 25a. For example, as shown in FIG. 5A, the first direction is parallel to the x-axis. A second portion of the collimated light beam 62a (i.e., light beam 64b) is incident on the second surface 68a. The second portion 64b is reflected by the second surface 68a as a second output beam 70b. The second output beam 70b projects along a second direction which is opposite to the first direction, parallel to the x-axis.

The beamsplitter 56a is arranged such that a third portion of the collimated light beam 62a (i.e., light beam 64c) bypasses the beamsplitter 56a and is a third output beam 64c. The third output beam 64c projects parallel to the optical axis 25a, and is, therefore, orthogonal to the first direction and the second direction. Thus, the third output beam 64c is emitted from the three beam generator 20 without passing through and/or being incident on the beamsplitter 56a.

With reference to FIGS. 6A-6B, the beamsplitter 56b of the two beam generator 22 is arranged such that substantially all of the collimated light beam 62b is incident on the two surfaces 66b, 68b. More particularly, a first portion of the collimated light beam 62b (i.e., light beam 64d) is incident on the first surface 66b of the beamsplitter 56b. The first portion 64d is reflected by the first surface 66b as a fourth output beam 70c. The fourth output beam 70c projects along a fourth direction orthogonal to the optical axis 25b (y-axis). For example, as shown in FIG. 6A, the fourth direction is parallel to the z-axis. A second portion of the collimated light beam 62b (i.e., light beam 64e) is incident on the second surface 68b of the beamsplitter 56b. The second portion 64e is reflected by the second surface 68b as a fifth output beam 70d. The fifth output beam 70d projects along a fifth direction opposite to the fourth direction, parallel to the z-axis.

In the example embodiment, the three beam generator 20 is arranged above and slightly offset from the two beam generator 22. It will be appreciated by one skilled in the art that the three beam generator 20 and the two beam generator 22 of the laser light generator 14 may be arranged in other suitable configurations and is not limited to the configuration depicted. In addition, while a particular direction for the light beams is depicted in the figures, the three beam generator 20 and the two beam generator 22 may be configured to generate the three light beams and the two light beams, respectively, in directions different from the ones depicted.

With reference to FIG. 7, the beamsplitter 56 may be a prism having a truncated triangular cross-section 89 (area within solid lines). For example, the beamsplitter 56 may have surfaces 90, 92, 94, 96. The surfaces 90, 92, 94, 96 form the truncated triangular cross-section 89, Surfaces 90, 94, and 96 may be viewed as the three sides of a triangular prism. A portion of the triangular prism is removed to form truncated surface 92. For example, as shown in FIG. 7, the portion trimmed from the triangular prism is a truncated area 98 (area within the dotted lines).

With reference to FIGS. 5A, 5B and 7, with the truncated triangular cross-section 89, the beamsplitter 56a of the three beam generator 20 receives the first portion 64a and the second portion 64b of the collimated light beam 62a at two incident surfaces 66a/96, 68a/94 where one of the two incident surfaces 68a/94 is truncated. The beamsplitter 56a is arranged in relation to the light source 50a so that the third portion 64c of the collimated light beam 62a bypasses the beamsplitter 56a and passes through the truncated area 98.

The laser beam generating device 10 utilizes the laser light generator 14 to generate up to five light beams along five directions which appear to originate from the common point 40. The laser light generator 14 uses a simple optics configuration for generating up to five light beams which have substantially equal power and strength. For example, the laser light generator 14 uses standard components, such as a prism for the beamsplitter 56. Thus, the cost of the laser beam generating device 10 may be lower than other beam generating devices that require custom components.

Figure 9B:
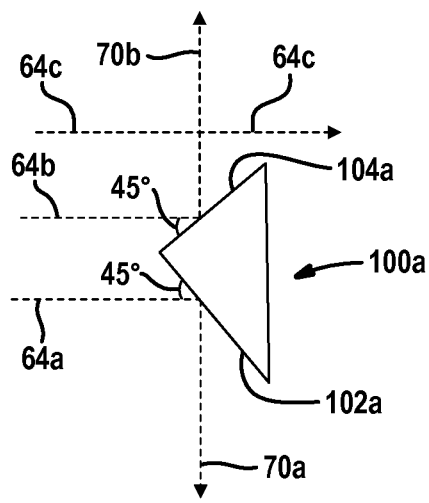
FIG. 9B is a top view of the three beam generator of the laser light generator of FIG. 9A.
Figure 9C:
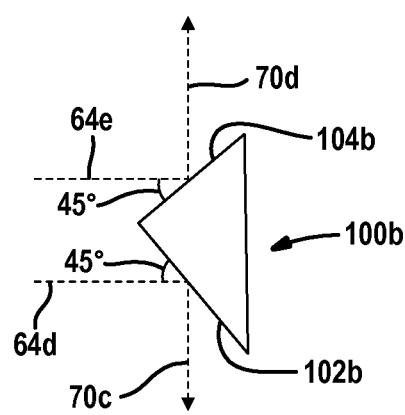
FIG. 9C is a side view of the two beam generator of the laser light generator of FIG. 9A.

In the example embodiment, the laser beam generating device 10 utilizes a prism having a truncated triangular configuration (beamsplitter 56). Alternatively, the laser beam generating device 10 may utilize a prism having a standard triangular configuration. For example, as shown in FIGS. 8-9C, the laser beam generating device 10 may utilize a beamsplitter 100. The beamsplitter 100 is a prism having a triangular cross-section, and is smaller in size than the beamsplitter 56, thereby further reducing the cost of the laser beam generating device 10.

Similar to the beamsplitter 56, the beamsplitter 100 has two incident surfaces (a first surface 102 and a second surface 104) orientated at forty five degrees with respect to the optical axis 25. With regard to the three beam generator 20, as show in FIGS. 9A-9B, the first portion 64a of the collimated light beam 62a is incident on the first surface 102a and is reflected by the first surface 102a as the first output beam 70a. The second portion 64b of the collimated light beam 62a is incident on the second surface 104a and is reflected by the second surface 104a as the second output beam 70b. The beamsplitter 100a is arranged such that the third portion 64c of the collimated light beam 62a bypasses the beamsplitter 100a and forms the third output beam 64c.

With regard to the two beam generator 22, as shown in FIGS. 9A and 9C, the beamsplitter 100b of the two beam generator 22 is arranged such that substantially all of the collimated light beam 62b is incident on two incident surfaces. For example, the first portion 64d of the collimated light beam 62b is incident on the first surface 102b and is reflected by the first surface 102b as the fourth output beam 70c. The second portion 64e of the collimated light beam 62b is incident on the second surface 104b and is reflected by the second surface 104b as the fifth output beam 70d.

As another alternative, the laser light generator 14 may use reflective mirrors instead of a prism as a beamsplitter. For example, with reference to FIGS. 10A-10C the laser light generator 14 utilizes a beamsplitter 110 having two incident surfaces (a first surface 112 and a second surface 114) orientated at forty five degrees with respect to the optical axis 25 (reference numbers 110, 112, and 114 are generic references to 110a,b, 112a,b, and 114a,b shown in figures). By utilizing reflective mirrors in lieu of a prism as the beamsplitter 110, the cost of the laser beam generating device 10 may be reduced.

Figure 10A:
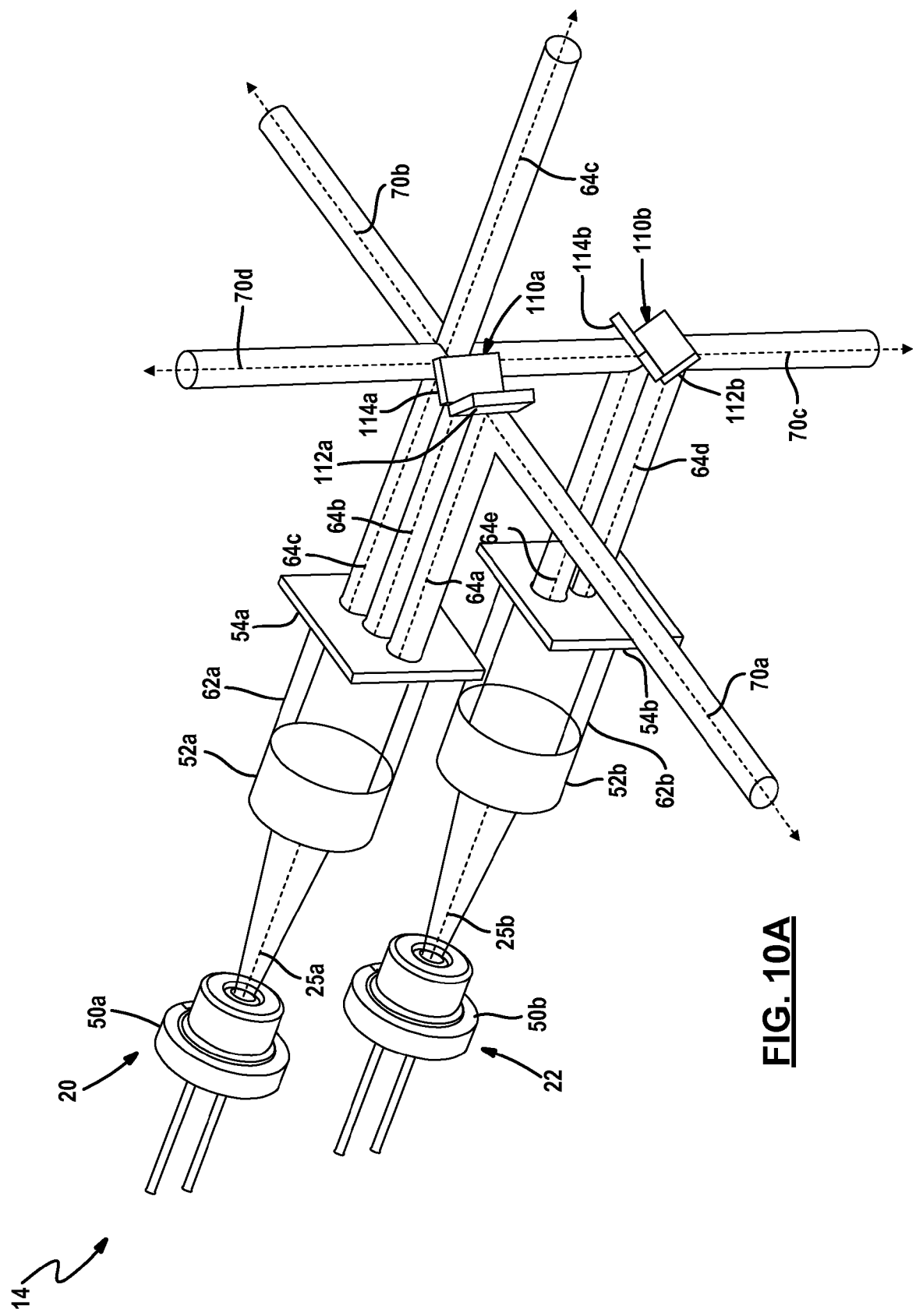
FIG. 10A is a perspective view of the laser light generator including reflective mirrors as a beamsplitter.
Figure 10B:
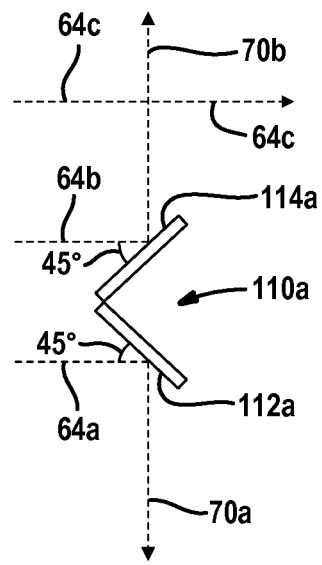
FIG. 10B is a top view of the three beam generator of the laser light generator of FIG. 10A.

The beamsplitter 110 functions in substantially the same manner as the beamsplitter 56 and the beamsplitter 100. With regard to the three beam generator 20, as shown in FIGS. 10A and 10B, the beamsplitter 110a of the three beam generator 20 is arranged such that some of the collimated light beam 62a is incident to the beamsplitter 110a and some of the collimated light beam 62a bypasses the beamsplitter 110a. For example, the first portion 64a of the collimated light beam 62a is incident on the first surface 112a and is reflected from the first surface 112a as the first output beam 70a. The second portion 64b of the collimated light beam 62a is incident on the second surface 114a and is reflected from the second surface 114a as the second output beam 70b. The beamsplitter 110a is arranged such that the third portion 64c of the collimated light beam 62a bypasses the beamsplitter 110a, and is the third output beam 64c.

Figure 10C:
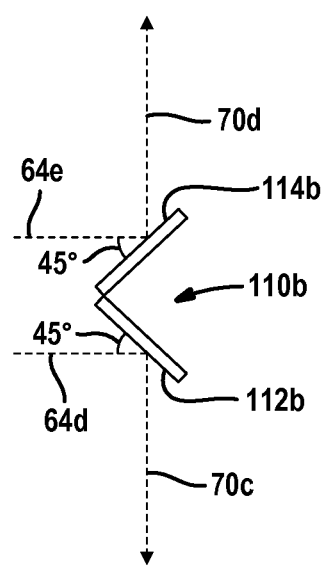
FIG. 10C is a side view of the two beam generator of the laser light generator of FIG. 10A.

With regard to the two beam generator 22, as shown in FIGS. 10A and 10C, the beamsplitter 110b of the two beam generator 22 is arranged such that substantially all of the collimated light beam 62b is incident on the two incident surfaces. For example, the first portion 64d of the collimated light beam 62b is incident on the first surface 112b of the beamsplitter 110b and is reflected from the first surface 112b as the fourth output beam 70c. The second portion 64e of the collimated light beam 62b is incident on the second surface 114b of the beamsplitter 110b and is reflected from the second surface 114b as the fifth output beam 70d.

Although the three beam generator 20 and the two beam generator 22 are depicted as having the same beamsplitter, it would be appreciated by one skilled in the art that different beamsplitters may be employed. For example, the three beam generator 20 may include the beamsplitter 56, whereas the two beam generator 22 may include the beamsplitter 100.

While in the example embodiment, the laser light generator 14 includes the shaping member 54, it would be appreciated by one skilled in the art that the shaping member 54 may be removed from the laser light generator 14. Thus, further reducing the cost of laser beam generating device 10.

Figure 11:
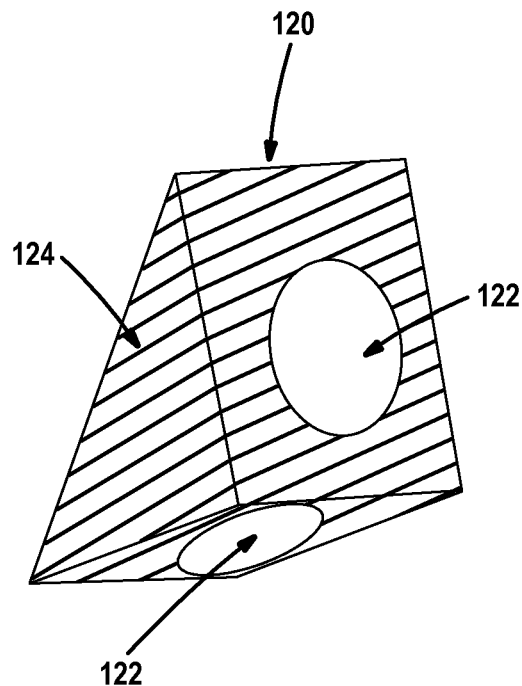
FIG. 11 is perspective view of an example beamsplitter having a film with non-reflective properties and a reflective area.
Figure 12:
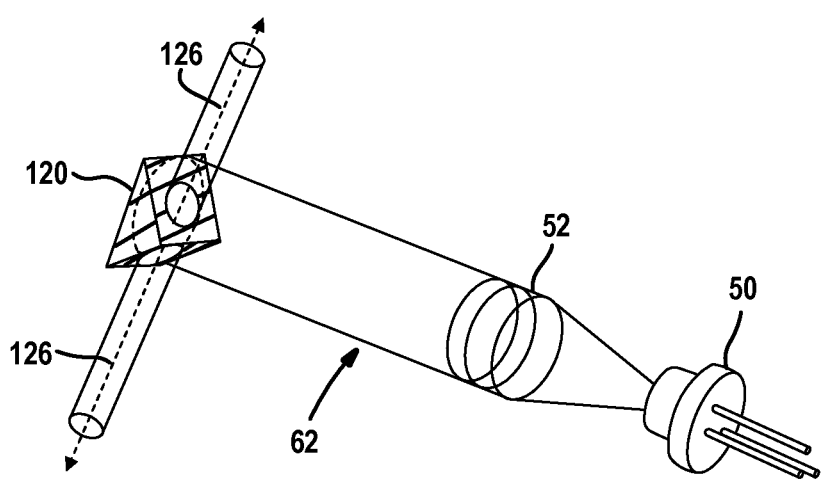
FIG. 12 is a perspective view of the laser light generator having the beamsplitter of FIG. 11.

By employing the shaping member 54, the laser light generator 14 generates output beams having a defined symmetrical cross-section. As an alternative to the shaping member 54, the laser light generator 14 may include a beamsplitter 120. With reference to FIGS. 11 and 12, an example of the beamsplitter 120 is depicted as a prism having a triangular cross-section similar to the beamsplitter 100. The beamsplitter 120 has reflective and non-reflective properties. More particularly, the beamsplitter 120 includes a film 124 having non-reflective properties disposed on a substantial portion of its surface. In addition, the two incident surfaces of the beamsplitter 120 include a reflective area 122 which may be, for example, a portion of the surface that does not include the film 124.

As illustrated in FIG. 12, as the collimated light beam 62 is incident on the beamsplitter 120, portions of the collimated light beam 62 that are incident on the reflective area 122 are output from the reflective area 122 as, for example, output beams 126. Conversely, portions of the collimated light beam 62 that are incident on the film 124 are absorbed by the beamsplitter 120. In the example embodiment, the reflective area 122 is circular in shape, thereby forming the output beams 126 with a circular cross-section.

By utilizing the beamsplitter 120, the laser light generator 14 generates output beams with a defined cross-section without the use of the shaping member 54. It would be appreciated by one skilled in the art that the reflective area 122 may have another shape and is not limited to a circle as depicted in the figures. While the beamsplitter 120 is configured as a triangular prism similar to beamsplitter 100, the beamsplitter 120, which has reflective and non-reflective properties, may have various suitable configurations, such as the beamsplitter 56, the beamsplitter 110, or other suitable configurations.

Figure 13:
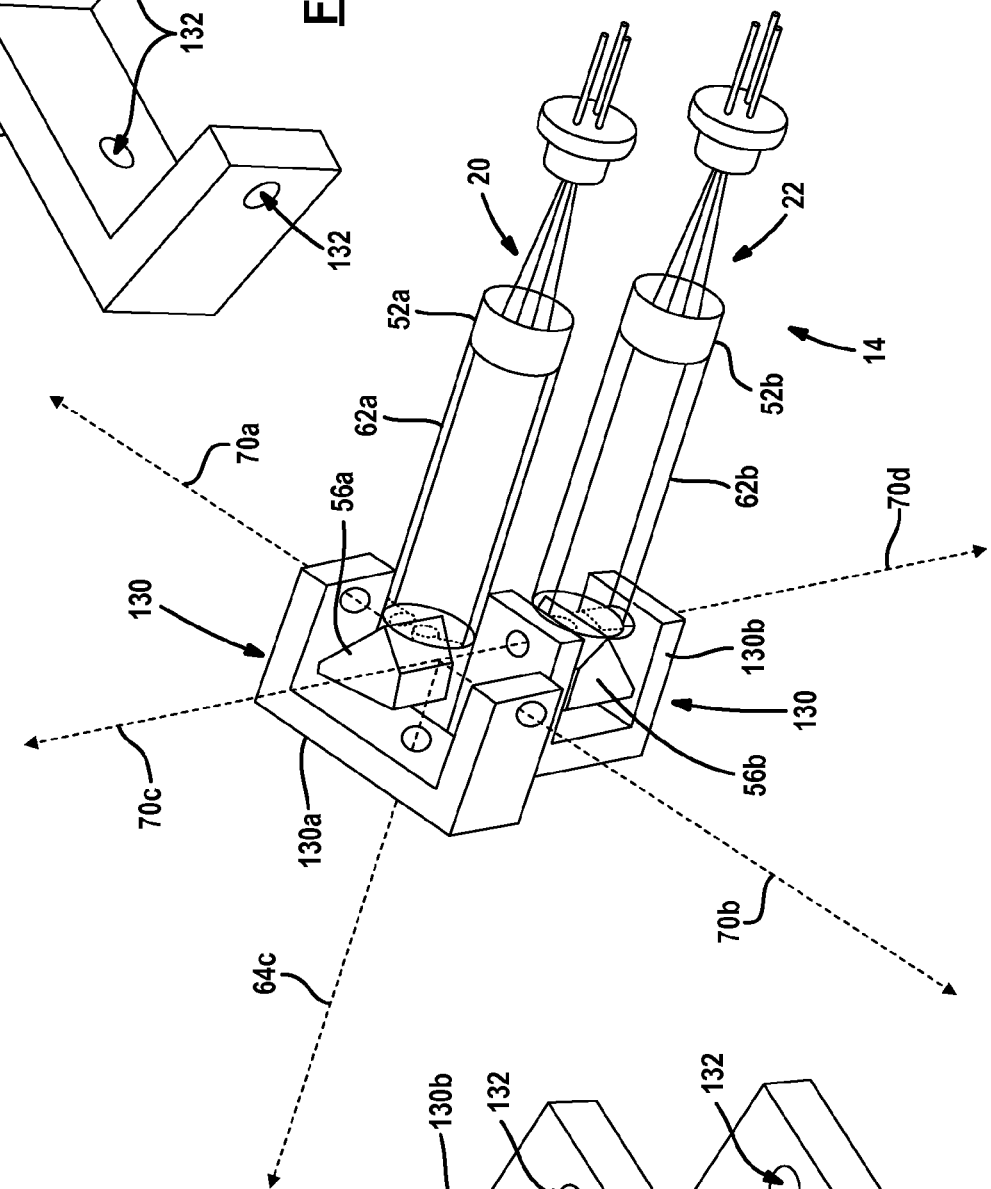
FIG. 13 is a perspective view of the laser light generator including a shaping member disposed after a beamsplitter.
Figure 14:
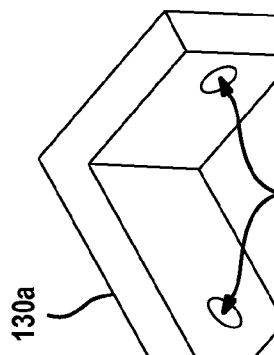
FIG. 14 is a perspective view of a three hole shaping member for the three beam generator of the laser light generator of FIG. 13.
Figure 15:
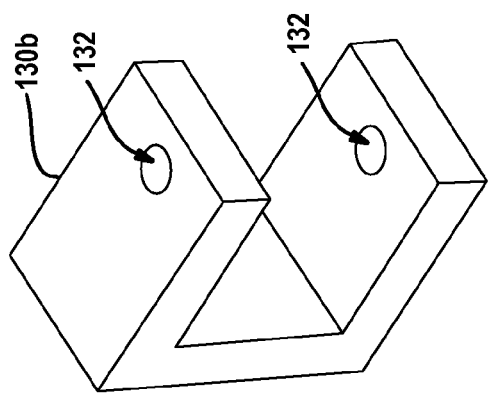
FIG. 15 is a perspective view of a two hole shaping member for the two beam generator of the laser light generator of FIG. 13.

In the example embodiment, the shaping member 54 is arranged between the collimating lens 52 and the beamsplitter 56. In an alternative embodiment, as shown in FIGS. 13-15, the laser light generator 14 includes a shaping member 130. The shaping member 130 is disposed within the housing 12 and is posterior of the beamsplitter 56.

Similar to the shaping member 54, the shaping member 130 defines multiple apertures 132. The shaping member 130 is positioned in relation with the housing 12 and the beamsplitter 56, such that light is incident on an interior surface of the shaping member 130. A portion of the light exits from the apertures 132 of the shaping member 130 and the openings 18 of the housing 12 as an output beam, and the remainder of the light is blocked by the interior surface. The aperture 132 is sized such that the cross-sectional area of the aperture 132 is less than the cross-sectional area of the light reflected from the beamsplitter 56 which is incident on the interior surface of the shaping member. Accordingly, the laser beam generating device 10 emits light beams having a defined symmetrical cross-section.

With regard to the three beam generator 20, a three-hole shaping member 130a is employed. The three-hole shaping member 130a is aligned with the beamsplitter 56a to receive three intermediate portions of light. For example, the laser light generator 14 is configured such that a first portion of the collimated light beam 62a emitted from the collimating lens 52a is incident on the first surface 66a of the beamsplitter 56a. The first portion of the collimated light beam 62a is reflected by the first surface 66a as a first intermediate portion of the collimated light beam 62a. The first intermediate portion is incident on a first interior surface of the shaping member 130a. A portion of the first intermediate portion passes through its respective aperture 132 as an output beam 70a, and the remaining portion of the first intermediate portion is blocked by the first interior surface of the shaping member 130a.

Similarly, a second portion of the collimated light beam 62a is incident on the second surface 68a of the beamsplitter 56a. The second portion of the collimated light beam 62a is reflected by the second surface 68a as a second intermediate portion of the collimated light beam 62a. The second intermediate portion is incident on a second interior surface of the shaping member 130a. A portion of the second intermediate portion passes through its respective aperture 132 as an output beam 70b, and the remaining portion of the second intermediate portion is blocked by the second interior surface of the shaping member 130a. The aperture 132 for the second output beam 70b is opposite of the aperture 132 for the first output beam 70a.

After bypassing the beamsplitter 56a, a third intermediate portion of the collimated light beam 62a is incident on a third interior surface of the shaping member 130a. A portion of the third intermediate portion passes through its respective aperture 132 as an output beam 64c, and the remaining portion of the third intermediate portion is blocked by the third interior surface of the shaping member 130a.

With regard to the two beam generator 22, a two-hole shaping member 130b is employed. The two-hole shaping member 130b is aligned with the beamsplitter 56b to receive the intermediate portions of light. For example, the laser light generator 14 is configured such that a first portion of the collimated light beam 62b emitted from the collimating lens 52b is incident on the first surface 66b of the beamsplitter 56b. The first portion of the collimated light beam 62b is reflected by the first surface 66b as a first intermediate portion of the collimated light beam 62b. The first intermediate portion is incident on a first interior surface of the shaping member 130b. A portion of the first intermediate portion passes through its respective aperture 132 as an output beam 70c, and the remaining portion of the first intermediate portion is blocked by the first interior surface of the shaping member 130b.

Similarly, a second portion of the collimated light beam 62b is incident on the second surface 68b of the beamsplitter 56b. The second portion of the collimated light beam 62b is reflected by the second surface 68b as a second intermediate portion of the collimated light beam 62b. The second intermediate portion is incident on a second interior surface of the shaping member 130b. A portion of the second intermediate portion passes through its respective aperture 132 as an output beam 70d, and the remaining portion of the second intermediate portion is blocked by the second interior surface of the shaping member 130b. The aperture 132 for the second output beam 70d is opposite to the aperture 132 for the first output beam 70c.

While the shaping member (shaping member 54 and shaping member 130) is depicted as one piece in the drawings, the shaping member may be made of multiple pieces. For example, shaping member 54A which defines three apertures may include three pieces, where each piece defines one aperture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, operations, elements, and/or components, but do not preclude the presence or addition of one or more other features, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, and/or regions, these elements, components, and/or regions, should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, and/or region, discussed below could be termed a second element, component, and/or region, without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A laser beam generating device, comprising:
a housing having at least three openings for emitting light beams; and
a laser light generator disposed in the housing and operable to generate three output beams, the laser light generator includes
a light source projecting light along an optical axis toward a beamsplitter, and
a collimating lens interposed on the optical axis between the light source and the beamsplitter, wherein the beamsplitter has two incident surfaces orientated at forty-five degrees in relation to the optical axis, such that a first portion of the light from the light source is incident on a first surface of the two incident surfaces and reflected by the first surface as a first output beam in a first direction orthogonal to the optical axis and a second portion of the light from the light source is incident on a second surface of the two incident surfaces and reflected by the second surface as a second output beam in a second direction opposite the first direction, wherein the light source is arranged in relation to the beamsplitter such that a third portion of the light from the light source bypasses the beamsplitter and forms a third output beam projected parallel to the optical axis.

2. The laser beam generating device of claim 1 wherein the beamsplitter is further defined as a triangular prism.

3. The laser beam generating device of claim 2 wherein the triangular prism having an incident surface truncated such that the third portion of the light from the light source passes through a truncated area of the triangular prism.

4. The laser beam generating device of claim 1 wherein the beamsplitter includes a non-reflective film disposed on its surface and includes a reflective area on the two incident surfaces such that as the first portion and the second portion of the light are incident on the first surface and the second surface, respectively, the first output beam and the second output beam are output from the reflective area of the first surface and the reflective area of the second surface, respectively.

5. The laser beam generating device of claim 1 wherein the laser light generator further comprises:

a shaping member disposed between the collimating lens and the beamsplitter, the shaping member defines at least one aperture and is arranged in relation with the light source and the beamsplitter such that the light from the light source is projected from the shaping member via the at least one aperture.

6. The laser beam generating device of claim 1 wherein the shaping member defines at least three apertures along a straight line with two apertures of the at least three apertures disposed at opposite ends of the straight line, and the shaping member is arranged in relation with the light source and the beamsplitter such that the third portion of the light from the light source passes through one of the two apertures.

7. The laser beam generating device of claim 1 further comprising:

a shaping member disposed posterior of the beamsplitter, wherein the shaping member defines at least three apertures and is arranged in relation with the beamsplitter, such that the first output beam, the second output beam, and the third output beam from the laser light generator are directed to respective three apertures of the shaping member thereby outputting a final output beam with a symmetrical cross-section.

8. The laser beam generating device of claim 1 wherein the light source is further defined as a reflective mirror.

9. The laser beam generating device of claim 1 further comprising:

a leveling mechanism disposed in the housing and operably coupled to the laser light generator, wherein the leveling mechanism operates to level the optical axis of the laser light generator.

10. The laser beam generating device of claim 9 wherein the leveling mechanism further comprises:

a chassis that houses the laser light generator; and a gimbal assembly that pivotably couples the chassis to the housing such that the chassis levels the optical axis of the laser light generator.

11. A laser beam generating device, comprising:

a housing having at least three openings for emitting light beams;

a laser light generator disposed in the housing and operable to generate three output beams, the laser light generator includes a light source projecting light along an optical axis toward a beamsplitter, and a collimating lens interposed on the optical axis between the light source and the beamsplitter, wherein the beamsplitter has two incident surfaces orientated at forty-five degrees in relation to the optical axis, such that a first portion of the light from the light source is incident on a first surface of the two incident surfaces and reflected by the first surface as a first output beam in a first direction orthogonal to the optical axis and a second portion of the light from the light source is incident on a second surface of the two incident surfaces and reflected by the second surface as a second output beam in a second direction opposite the first direction, wherein the light source is arranged in relation to the beamsplitter such that a third portion of the light from the light source bypasses the beamsplitter and forms a third output beam projected parallel to the optical axis; and a shaping member disposed in the housing posterior of the laser light generator, wherein the shaping member defines at least one aperture which aligns with a given opening of the housing, such that a given output beam passes through the aperture of the shaping member and the given opening of the housing.

12. The laser beam generating device of claim 11 wherein the beamsplitter is further defined as a triangular prism.

13. The laser beam generating device of claim 12 wherein the triangular prism having one of the two incident surfaces truncated such that the third portion of the light from the light source passes through a truncated area of the triangular prism.

14. The laser beam generating device of claim 11 wherein the beamsplitter is further defined as a reflective mirror.

15. The laser beam generating device of claim 11 further comprising:

a leveling mechanism disposed in the housing and operably coupled to the laser light generator, wherein the leveling mechanism operates to level the optical axis of the laser light generator.

16. The laser beam generating device of claim 11 wherein the beamsplitter includes a non-reflective film disposed on its surface and includes a reflective area on the two incident surfaces such that as the first portion and the second portion of the light are incident on the first surface and the second surface, respectively, the first output beam and the second output beam are output from the reflective area of the first surface and the reflective area of the second surface, respectively.

17. The laser beam generating device of claim 11, wherein the shaping member has at least three panels each defining one aperture, two panels of the at least three panels are positioned on opposite ends of a third panel of the at least three panels, and the shaping member is arranged in relation with the beamsplitter such that the two panels receive the first output beam and the second output beam and the third panel disposed between the two panels receives the third output beam.

18. The laser beam generating device of claim 17, wherein the at least three panels of the shaping member are arranged separately from each other.

19. The laser beam generating device of claim 17, wherein the at least three panels of the shaping member are coupled to each other, such that the shaping member is one piece.

20. A laser beam generating device, comprising:
- a housing having at least five openings for emitting light beams;
- a laser light generator disposed in the housing and operable to generate up to five mutually orthogonal output beams appearing to originate from a common point, the laser light generator includes
  - a three beam generator operable to generate three output beams and includes a first laser diode projecting light along a first optical axis toward a first beamsplitter and a first collimating lens interposed on the first optical axis between the first laser diode and the first beamsplitter, wherein the first beamsplitter has two incident surfaces orientated at forty-five degrees in relation to the first optical axis, such that a first portion of the light from the first laser diode is incident on a first surface of the two incident surfaces and output from the first surface as a first output beam in a first direction orthogonal to the first optical axis and a second portion of the light from the first laser diode is incident on a second surface of the two incident surfaces and output from the second surface as a second output beam in a second direction opposite the first direction, and the first laser diode is arranged in relation to the first beamsplitter such that a third portion of the light from the first laser diode bypasses the first beamsplitter and forms a third output beam projected along the first optical axis, and
  - a two beam generator operable to generate two output beams and includes a second laser diode projecting light along a second optical axis towards a second beamsplitter, and a second collimating lens interposed on the second optical axis between the second laser diode and the second beamsplitter, wherein the second beamsplitter has two incident surfaces orientated at forty-five degrees in relation to the second optical axis, such that a first portion of the light from the second laser diode is incident on a first surface of the two incident surfaces and output from the first surface as a fourth output beam in a fourth direction orthogonal to the second optical axis and a second portion of the light from the second laser diode is incident on a second surface of the two incident surfaces of the second beamsplitter and output from the second surface as a fifth output beam in a fifth direction opposite the fourth direction,
  - wherein the first optical axis and the second optical axis are parallel to each other;
- a first shaping member disposed in the housing posterior of the three beam generator, wherein the first shaping member defines three apertures which align with three of the at least five openings of the housing, such that the three output beams from the three beam generator pass through respective three apertures of the first shaping member and respective three openings of the housing;
- a second shaping member disposed in the housing posterior of the two beam generator, wherein the second shaping member defines two apertures which align with two of the at least five openings of the housing which are different from the three of the at least five openings of the housing for the three beam generator, such that the two output beams from the two beam generator pass through respective two apertures of the second shaping member and respective two openings of the housing.

* * * * *